United States Patent
Lin et al.

(10) Patent No.: US 12,043,119 B2
(45) Date of Patent: Jul. 23, 2024

(54) TIMING CONTROL CIRCUIT, IN-VEHICLE CENTER CONSOLE AND VEHICLE

(71) Applicants: Faurecia Clarion Electronics Co., Ltd., Saitama (JP); Subaru Corporation, Tokyo (JP)

(72) Inventors: Qingyun Lin, Xiamen (CN); Yanxiang Chen, Xiamen (CN); Jicu Zhang, Xiamen (CN); Xionghui Lai, Xiamen (CN)

(73) Assignees: Faurecia Clarion Electronics Co., Ltd., Saitama (JP); Subaru Corporation, Tokyo (JP)

(*) Notice: Subject to any disclaimer, the term of this patent is extended or adjusted under 35 U.S.C. 154(b) by 0 days.

(21) Appl. No.: 18/134,221

(22) Filed: Apr. 13, 2023

(65) Prior Publication Data
US 2023/0339330 A1    Oct. 26, 2023

(30) Foreign Application Priority Data
Apr. 26, 2022    (CN) .......................... 202210451756.2

(51) Int. Cl.
*B60L 1/00*    (2006.01)
(52) U.S. Cl.
CPC ................... *B60L 1/006* (2013.01)
(58) Field of Classification Search
CPC ....................................................... B60L 1/006

USPC ................................................... 307/9.1, 10.1
See application file for complete search history.

(56) References Cited

FOREIGN PATENT DOCUMENTS

| CN | 104199700 A | 12/2014 |
|---|---|---|
| CN | 204290912 U | * 4/2015 |
| CN | 109104170 B | 7/2019 |
| CN | 210091164 U | 2/2020 |

OTHER PUBLICATIONS

CN 204290912, English translation, downloaded from espacenet.com, May 22, 2024. (Year: 2024).*

* cited by examiner

*Primary Examiner* — Hal Kaplan
(74) *Attorney, Agent, or Firm* — Patterson + Sheridan, LLP

(57) ABSTRACT

A timing control circuit is applied to the in-vehicle center console, and includes a hub, a first resistor, a capacitor, and a voltage conversion circuit. The hub is configured to be coupled to an on board unit, and a power supply control terminal of the hub is coupled to a first terminal of the first resistor. A second terminal of the first resistor is coupled to a first terminal of the capacitor and an input terminal of the voltage conversion circuit, a second terminal of the capacitor is grounded, and an output terminal of the voltage conversion circuit is used to connect an external device.

12 Claims, 5 Drawing Sheets

TIMING CONTROL CIRCUIT, IN-VEHICLE CENTER CONSOLE AND VEHICLE

CROSS-REFERENCE TO RELATED APPLICATION

This application claims priority to Chinese Patent Application No. 202210451756.2, filed on Apr. 26, 2022, which is incorporated herein by reference in its entirety.

TECHNICAL FIELD

The present disclosure relates to the field of in-vehicle center console, in particular, to a timing control circuit, an in-vehicle center console and a vehicle.

BACKGROUND

With the development of automobile multimedia, an external device (e.g., a mobile phone) may be connected to an in-vehicle center console through a universal serial bus (USB) interface. In a case where the external device is not connected to the in-vehicle center console, the in-vehicle center console is a master device. In a case where the in-vehicle center console and the external device are successfully connected, the in-vehicle center console is a slave device, and the external device is a master device. In a case where the in-vehicle center console is switched from the master device to the slave device, a power supply control terminal of the in-vehicle center console may generate a transient low voltage pulse due to the internal reconfiguration of the in-vehicle center console, so that a direct current-direct current (DC-DC) power supply of the in-vehicle center console outputs a transient low voltage pulse to the external device. This is equivalent to reconnecting the external device. As a result, the external device may be disconnected from the in-vehicle center console.

SUMMARY

In a first aspect, a timing control circuit is provided. The timing control circuit includes a hub, a first resistor, a capacitor, and a voltage conversion circuit. The hub is used to be coupled to an on board unit, and a power supply control terminal of the hub is coupled to a first terminal of the first resistor. A second terminal of the first resistor is coupled to a first terminal of the capacitor and an input terminal of the voltage conversion circuit, a second terminal of the capacitor is grounded, and an output terminal of the voltage conversion circuit is used to be connected to an external device.

In some embodiments, the hub includes a second resistor, a first terminal of the second resistor is coupled to a voltage terminal, and a second terminal of the second resistor is the power supply control terminal of the hub.

In some embodiments, a resistance of the first resistor meets a following formula:

$$\ln\frac{V_{dd} - V_{s1}}{V_{dd}} - \ln r_2 + \ln(r_1 + r_2) < 0;$$

where $V_{dd}$ is a voltage of the voltage terminal, $V_{S1}$ is a voltage of the power supply control terminal, $r_1$ is a resistance of the first resistor, and $r_2$ is a resistance of the second resistor.

In some embodiments, a capacitance of the capacitor meets a following formula:

$$C \leq -\frac{T_2}{\ln\frac{V_2}{V_{S2}} \times r_1};$$

where C is the capacitance of the capacitor, $V_2$ is a second voltage, $V_{S2}$ is an operating voltage of the input terminal of the voltage conversion circuit, and $T_2$ is a second preset time.

In some embodiments, the resistance of the first resistor further meets a following formula:

$$-\frac{T_S}{r_1 \times \ln\frac{V_{S2}}{V_{dd}}} \leq C;$$

where $T_S$ is a time when the power supply control terminal of the hub outputs a transient low voltage pulse.

In some embodiments, the capacitance of the capacitor further meets a following formula:

$$C \geq -\frac{T_S}{r_1 \times \ln\frac{V_2}{V_{dd}}}.$$

In some embodiments, the hub further includes a switching element. A first terminal of the switching element is coupled to the second terminal of the second resistor, a second terminal of the switching element is grounded, and a third terminal of the switching element is a control terminal. In a case where the timing control circuit triggers an overcurrent protection, the switching element is in an on state. In a case where the timing control circuit does not trigger the overcurrent protection, the switching element is in an off state.

In some embodiments, the capacitance of the capacitor further meets a following formula:

$$C \geq -\frac{T_3}{\ln\frac{V_2}{V_{S2}} \times r_1};$$

where $T_3$ is a third preset time.

In some embodiments, the resistance $r_1$ of the first resistor is greater than or equal to 66 kΩ and less than or equal to 89 kΩ, and the capacitance C of the capacitor is greater than or equal to 0.057 µF and less than or equal to 0.25 µF.

In some embodiments, the timing control circuit further includes a third resistor, a first terminal of the third resistor is coupled to the input terminal of the voltage conversion circuit, and a second terminal of the third resistor is grounded.

In second aspect, an in-vehicle center console is provided. The in-vehicle center console includes a vehicle controller and the timing control circuit according to any one of the embodiments in the first aspect.

In third aspect, a vehicle is provided. The vehicle includes the on board unit, the vehicle controller, and the timing control circuit according to any one of the embodiments in the first aspect.

BRIEF DESCRIPTION OF THE DRAWINGS

In order to describe technical solutions in the embodiments of the present disclosure more clearly, accompanying drawings to be used in the embodiments will be introduced briefly below. However, the accompanying drawings to be described below are merely accompanying drawings of some embodiments of the present disclosure, and a person of ordinary skill in the art can obtain other drawings according to these accompanying drawings.

DETAILED DESCRIPTION

Figure 1:
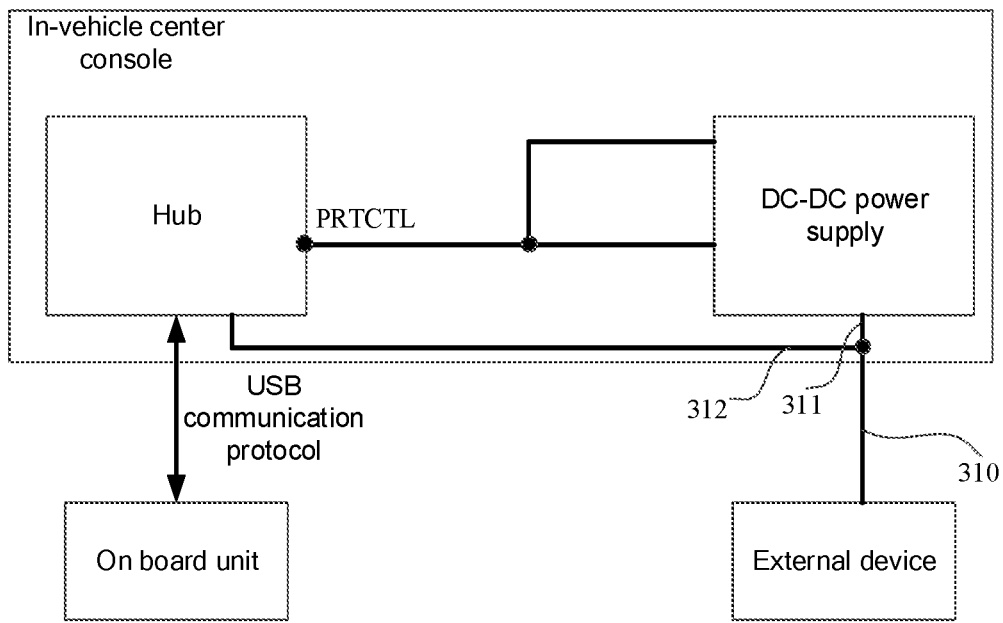
FIG. 1 is a schematic diagram showing a circuit structure of an in-vehicle center console, in accordance with embodiments of the present disclosure.

Technical solutions in the embodiments of the present disclosure will be clearly and completely described with reference to the accompanying drawings in the embodiments of the present disclosure below. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive sense, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above term do not necessarily refer to the same embodiment(s) or example(s). In addition, the specific features, structures, materials or characteristics may be included in any one or more embodiments or examples in any suitable manner.

Hereinafter, the terms such as "first" and "second" are only used for descriptive purposes, and are not to be construed as indicating or implying the relative importance or implicitly indicating the number of indicated technical features. Thus, a feature defined with the term such as "first" or "second" may explicitly or implicitly include one or more features. In the description of the embodiments of the present disclosure, the term "a plurality of" or "the plurality of" means two or more unless otherwise specified.

In the description of some embodiments, the terms such as "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components have direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has the same meaning as the phrase "at least one of A, B or C", both including following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The term "multiple" means at least two.

The phase "applicable to" or "configured to" used herein means an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values beyond those stated.

Generally, the vehicle may support at least one of in-vehicle systems such as Carplay or Android Auto. In a case where the in-vehicle system is Carplay, the external device compatible with the Carplay in-vehicle system (e.g., a mobile phone with an ios operating system) may be connected to the in-vehicle center console to enter Carplay mode, so as to control the vehicle. In a case where the in-vehicle system is Android Auto, the external device compatible with the Android Auto in-vehicle system (e.g., a mobile phone with an android operating system) may be connected to the in-vehicle center console to enter Android Auto mode, so as to control the vehicle.

FIG. 1 is a schematic diagram showing a circuit structure of an in-vehicle center console provided in some embodiments of the present disclosure. As shown in FIG. 1, the in-vehicle center console includes a hub and a DC-DC power supply. A power supply control terminal PRTCTL of the hub is coupled to an input terminal of the DC-DC power supply, and an output terminal of the DC-DC power supply is used to be connected to an external device (e.g., a mobile phone, a tablet or other device that may be connected to the in-vehicle center console). When the vehicle is started, an on board unit is powered on; and a voltage is transmitted to the hub, the hub transmits the voltage to the DC-DC power supply, and the DC-DC power supply transmits the voltage to the external device through a power line 311 in a data line 310, so that the external device is charged. In addition, the external device may be further coupled to the hub through a communication line 312 in the data line 310, and the hub exchanges information with the on board unit through a USB communication protocol, so that information interaction between the external device and the on board unit is realized.

When the external device is not connected to the in-vehicle center console, the in-vehicle center console is the master device. When the external device is connected to the in-vehicle center console through the data line 310 (for example, the Carplay or Android Auto is successfully connected), the external device is the master device, and the in-vehicle center console is the slave device. In this case, the power supply control terminal PRTCTL of the in-vehicle center console may generate a transient low voltage pulse due to the internal reconfiguration of the in-vehicle center console. The DC-DC power supply receives the transient low voltage pulse, and then outputs the transient low voltage pulse to the external device. This is equivalent to the reconnecting of the external device. As a result, the external device may be disconnected from the in-vehicle center console (for example, the Carplay mode or the Android Auto mode is exited).

In addition, if a voltage of the power supply control terminal PRTCTL of the in-vehicle center console rises to a threshold voltage for a long time, overcurrent protection may be triggered, resulting in a failure to enter the Carplay mode or the Android Auto mode.

In order to solve the problem that the external device may exit or fail to enter the Carplay mode or the Android Auto mode when the external device is connected to the in-vehicle center console, the embodiments of the present application provide a timing control circuit, which may be possible to discharge to a voltage conversion circuit through a capacitor when the power supply control terminal of the in-vehicle center console generates a transient low voltage pulse. As a result, the voltage conversion circuit can normally supply power to the external device, which ensures that the external device and the in-vehicle center console are not disconnected. In addition, the timing control circuit provided in the embodiments of the present disclosure may also ensure that when the on board unit is powered on, the voltage of the power supply control terminal can quickly rise to the threshold voltage in a short time without triggering the overcurrent protection.

Figure 2:
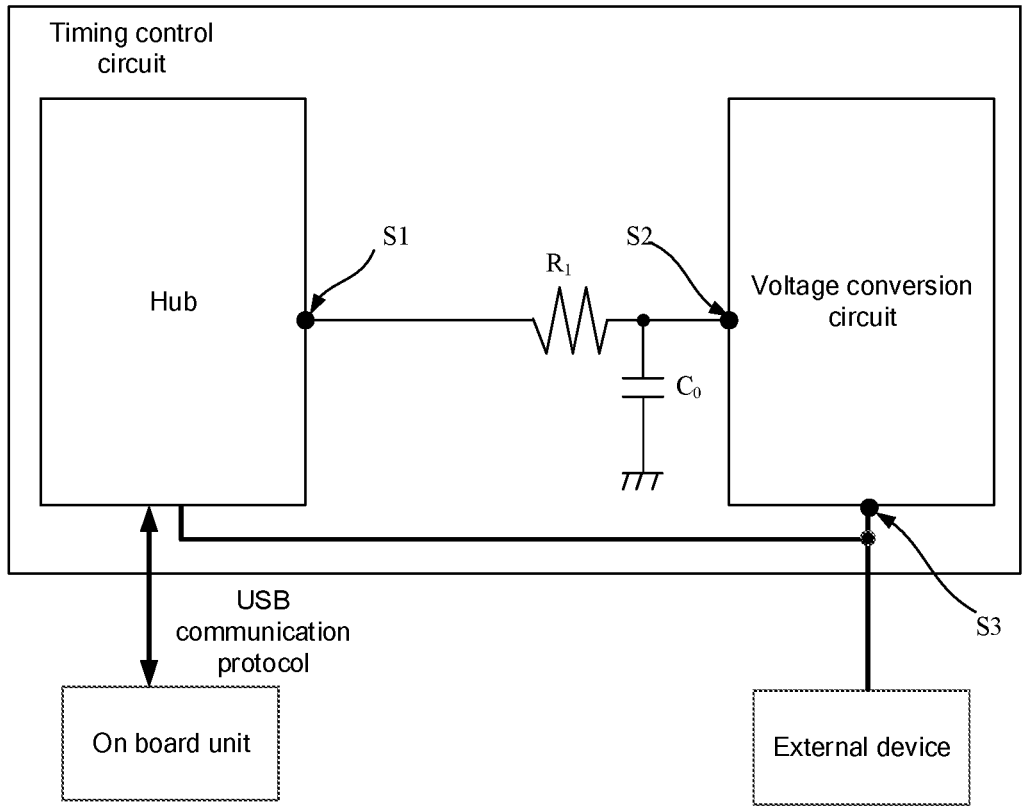
FIG. 2 is a schematic diagram showing a circuit structure of a timing control circuit, in accordance with embodiments of the present disclosure.

FIG. 2 is a schematic diagram showing a circuit structure of the timing control circuit provided in the embodiments of the present disclosure. The timing control circuit may be applied to the in-vehicle center console. The in-vehicle center console includes the timing control circuit provided in the embodiments of the present disclosure, and may also include other circuit structures or processors.

As shown in FIG. 2, the timing control circuit includes a hub, a voltage conversion circuit, a first resistor $R_1$ and a capacitor $C_0$. The hub is used to be coupled to the on board unit. A power supply control terminal S1 of the hub is coupled to a first terminal of the first resistor $R_1$, a second terminal of the first resistor $R_1$ is coupled to a first terminal of the capacitor $C_0$ and an input terminal S2 of the voltage conversion circuit, and a second terminal of the capacitor $C_0$ is grounded. The voltage conversion circuit is used to be connected to the external device. Based on this, the external device and the on board unit may be communicated with each other through the timing control circuit.

The external device may be a mobile phone, a tablet or other electronic device that may be connected to the in-vehicle center console, and the specific type of the external device is not limited in the embodiments of the present disclosure.

As shown in FIG. 2, when the on board unit is powered on, a voltage of the power supply control terminal S1 of the hub gradually rises, the capacitor $C_0$ is charged, and the capacitor $C_0$ stores electrical charge. When the external device is connected to the in-vehicle center console (for example, the Carplay or the Android Auto is successfully connected), the in-vehicle center console is switched from the master device to the slave device, which results in the internal reconfiguration of the in-vehicle center console, so that the power supply control terminal S1 of the hub generates a transient low voltage pulse. When the power supply control terminal S1 of the hub generates the transient low voltage pulse, the capacitor $C_0$ may discharge to the voltage conversion circuit, so that the voltage conversion circuit may normally supply power to the external device. Therefore, when the power supply control terminal S1 of the hub generates the transient low voltage pulse, the external device and the in-vehicle center console cannot be disconnected. In some embodiments, quantity of electrical charge stored in the capacitor $C_0$ may have been charged in the last time when the in-vehicle center console is connected to the external device.

As shown in FIG. 2, when the on board unit is powered on, the voltage of the power supply control terminal S1 of the hub gradually rises; since the first resistor $R_1$ is disposed between the power supply control terminal S1 and the capacitor $C_0$, the first resistor $R_1$ may cause the power supply control terminal S1 to charge the capacitor $C_0$ slowly. Therefore, the voltage of the power supply control terminal S1 rises faster, and it is ensured that a rising time for the voltage of the power supply control terminal S1 to rise to the first voltage is short (for example, the rising time for the voltage of the power supply control terminal S1 to rise to the first voltage is less than or equal to a first preset time). As a result, the timing control circuit does not trigger the overcurrent protection, and the external device cannot be disconnected to the in-vehicle center console. That is, in the present disclosure, fewer devices are added to solve the problem that when the external device is connected to the in-vehicle center console, the connection between the external device and the in-vehicle center console may be exited or failed; and there is no need to provide a special integrated circuit. Therefore, the production cost can be effectively reduced.

The first voltage is a threshold voltage. In a case where the time for the voltage of the power supply control terminal S1 to rise to the first voltage is less than or equal to the first preset time, the timing control circuit does not trigger the overcurrent protection. In a case where the time for the voltage of the power supply control terminal S1 to rise to the first voltage is greater than the first preset time, the timing control circuit may trigger the overcurrent protection. The first voltage may be less than or equal to a normal operating voltage of the hub. Specific values of the first voltage and the normal operating voltage of the hub are not limited in the embodiments of the present disclosure, and the specific value of the first voltage is related to the type of the hub. The following embodiments are described by taking an example in which the first voltage is 2 V and the normal operating voltage of the hub is 3.3 V.

In addition, if a capacitance of the capacitor $C_0$ is too large, it will cause the power supply control terminal S1 to charge the capacitor $C_0$ for a long time. As a result, the rising time for the voltage of the power supply control terminal S1 to rise to the first voltage is too long, and the overcurrent protection is triggered. In order to solve the problem that the overcurrent protection is triggered in a case where the rising time for the voltage of the power supply control terminal S1 to rise to the first voltage is too long, some embodiments of the present disclosure further restrict a discharge time of the capacitor $C_0$ (for example, the discharge time is less than or equal to a second preset time). Therefore, it is ensured that the capacitance of the capacitor $C_0$ is not too large, the time for the voltage of the power supply control terminal of the hub to rise to the first voltage is short, and the overcurrent protection is not triggered.

Figure 3:
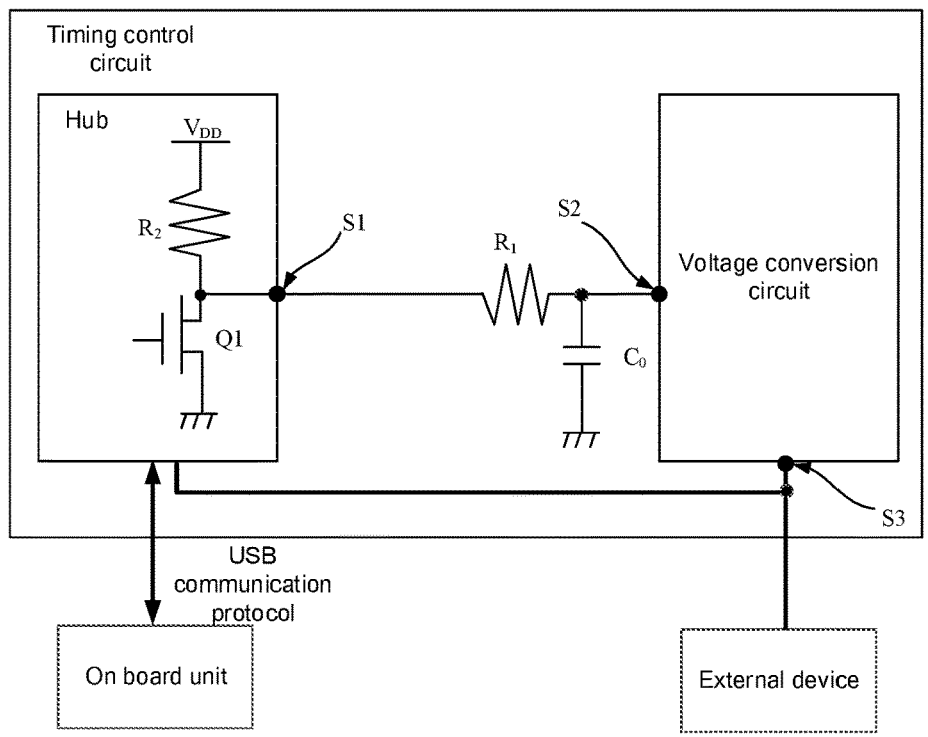
FIG. 3 is a schematic diagram showing a circuit structure of another timing control circuit, in accordance with embodiments of the present disclosure.

FIG. 3 is a schematic diagram showing a circuit structure of another timing control circuit provided in the embodiments of the present disclosure. As shown in FIG. 3, the hub includes a voltage terminal $V_{DD}$ and a second resistor $R_2$. A first terminal of the second resistor $R_2$ is coupled to the voltage terminal $V_{DD}$, and a second terminal of the second resistor $R_2$ is the power supply control terminal S1 of the hub.

In some embodiments, the hub may further include a switching element Q1. Considering an example in which the switching element Q1 is a metal oxide semiconductor (MOS) transistor, as shown in FIG. 3, a first terminal of the switching element Q1 is coupled to the power supply control terminal S1 of the hub, a second terminal of the switching element Q1 is grounded, and a third terminal of the switching element Q1 is a control terminal. The control terminal of the switching element Q1 may control the switching element Q1 to be turned on or off.

As shown in FIG. 3, in a case where duration in which a current of the external device is greater than or equal to a preset current is long, the timing control circuit triggers the overcurrent protection, and the switching element Q1 is turned on to pull down the voltage of the power supply control terminal S1 of the hub. In a case where the current of the external device is less than the preset current or the duration in which the current of the external device is greater than or equal to the preset current is short, the timing control circuit does not trigger the overcurrent protection, the switching element Q1 is turned off, and the timing control circuit works normally. That is, in the timing control circuit shown in FIG. 3, if the overcurrent protection is not triggered, the switching element Q1 in the hub is in an off state; and if the overcurrent protection is triggered, the switching element Q1 in the hub is an on state.

Figure 4:
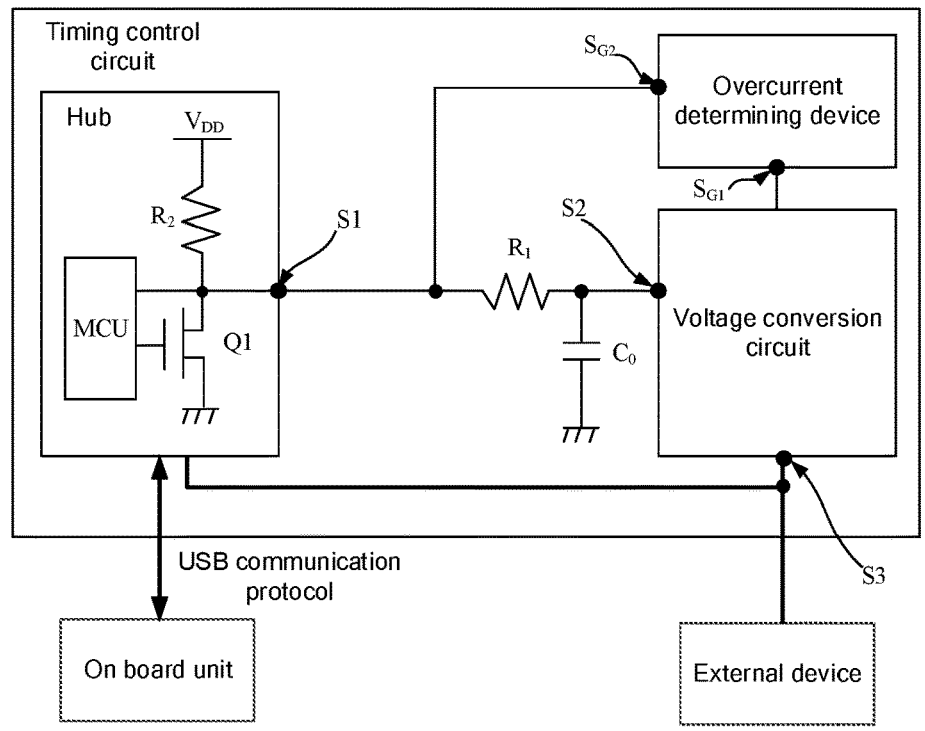
FIG. 4 is a schematic diagram showing a circuit structure of yet another timing control circuit, in accordance with embodiments of the present disclosure.

FIG. 4 is a schematic diagram showing a circuit structure of another timing control circuit provided in the embodiments of the present disclosure. As shown in FIG. 4, the timing control circuit further includes an overcurrent determining device and a microcontroller unit (MCU). A first terminal $S_{G1}$ of the overcurrent determining device is coupled to the voltage conversion circuit, and is used to detect a magnitude of the current of the external device connected to the voltage conversion circuit. A second terminal $S_{G2}$ of the overcurrent determining device is coupled to the power supply control terminal S1. The power supply control terminal S1 is coupled to a first terminal of the MCU, and a second terminal of the MCU is coupled to the control terminal of the switching element Q1. The MCU may communicate with the on board unit through the USB communication protocol.

It should be noted that the hub is not limited to using the MCU as a processor. In some embodiments, the processor is a central processing unit (CPU), a microprocessor, or an application specific integrated circuit (ASIC); and the processor may be configured to, when the processor executes a program stored in a non-transitory computer-readable medium that is coupled to the processor, perform corresponding operations. The non-transitory computer-readable storage medium may include a magnetic storage device (e.g., a hard disk, a floppy disk, or a magnetic tape), a smart card, or a flash memory device (e.g., an erasable programmable read-only memory (EPROM), a card, a stick, or a keyboard driver).

In some embodiments, the overcurrent determining device and the voltage conversion circuit in FIG. 4 may be integrated, or may be arranged separately, which is not limited in the embodiments of the present disclosure. For example, the overcurrent determining device and the voltage conversion circuit may be integrated in the DC-DC power supply.

As shown in FIG. 4, when the overcurrent determining device detects that the current of the external device is greater than or equal to the preset current, the second terminal $S_{G2}$ of the overcurrent determining device outputs a low voltage, and the power supply control terminal S1 outputs a low voltage. When the MCU detects that duration in which the power supply control terminal S1 outputs the low voltage is greater than or equal to a third preset time, the timing control circuit triggers the overcurrent protection, and the MCU controls the switching element Q1 to be turned on. At this time, the external device is disconnected from the in-vehicle center console. When the overcurrent determining device detects that the duration in which the current of the external device is greater than or equal to the preset current is less than the third preset time, the timing control circuit does not trigger the overcurrent protection, and the switching element Q1 is in an off state. When the overcurrent determining device detects an overcurrent of the external device and duration of the overcurrent is within a range of the third preset time, the capacitor $C_0$ discharges to the voltage conversion circuit, so as to ensure that the voltage conversion circuit can normally supply power to the external device, and the external device is not disconnected from the in-vehicle center console.

For example, the third preset time is 5 ms; when the overcurrent determining device detects that the duration of the overcurrent of the external device is 6 ms, the timing control circuit triggers the overcurrent protection, and the MCU controls the switching element Q1 to be turned on; and at this time, the external device is disconnected from the in-vehicle center console. For another example, when the overcurrent determining device detects that the duration of the overcurrent of the external device is 3 ms, the timing control circuit does not trigger the overcurrent protection, and the switching element Q1 is in an off state. The capacitor $C_0$ discharges to the voltage conversion circuit within the first 5 ms of the overcurrent determining device detecting the overcurrent of the external device, so as to ensure that the voltage conversion circuit can normally supply power to the external device, and the external device is not disconnected from the in-vehicle center console.

When the overcurrent determining device determines that the duration in which the current of the external device is greater than or equal to the preset current is greater than or equal to the third preset time, the MCU determines that the timing control circuit occurs the overcurrent. The MCU notifies, through the USB communication protocol, the on board unit that the current of the current external device is too large. The on board unit instructs, through the USB communication protocol, the MCU to perform the overcurrent protection. The MCU controls the switching element Q1 to be turned on after receiving the instruction, and the timing control circuit stops working.

It should be noted that, in order to ensure that the voltage conversion circuit can normally supply power to the external device in a case where the duration of the overcurrent of the external device is within a range of the third preset time, time for a voltage of the input terminal S2 of the voltage conversion circuit to decrease to a second voltage is required to be greater than or equal to the third preset time. When the voltage of the input terminal S2 of the voltage conversion circuit is greater than or equal to the second voltage, the output terminal S3 of the voltage conversion circuit outputs a current. That is, when the voltage of the input terminal S2 of the voltage conversion circuit is greater than or equal to the second voltage, the voltage conversion circuit may supply power to the external device.

In order to ensure that when the external device is connected to the in-vehicle center console, the transient low voltage pulse generated by the power supply control terminal S1 does not affect the connection between the external device and the in-vehicle center console, to ensure that when the on board unit is powered on, the voltage at the power supply control terminal S1 can rise to the first voltage in a short time without triggering the overcurrent protection, and to ensure that the voltage conversion circuit can normally supply power to the external device during a period from a start of the overcurrent of the external device to a time when the overcurrent protection is triggered, the resistance of the first resistor $R_1$ and the capacitance of the capacitor $C_0$ need to be limited. The resistance of the first resistor $R_1$ and the capacitance of the capacitor $C_0$ are related to the specific values of the following parameters: a voltage of the voltage terminal $V_{DD}$, the voltage of the power supply control terminal S1, a resistance of the second resistor $R_2$, the rising time for the voltage of the power supply control terminal S1 to rise to the first voltage, the first preset time, time in which the power supply control terminal S1 outputs the transient low voltage pulse, the first voltage, the second voltage, the decreasing time for the voltage of the input terminal S2 of the voltage conversion circuit to decrease to the second voltage, a discharge time from a start of the discharge of the capacitor $C_0$ to a time when the voltage of the input terminal S2 of the voltage conversion circuit is the second voltage, the second preset time, and the third preset time.

With reference to FIGS. 2 to 4, the working principle, the timing diagram and the circuit parameters of the timing control circuit are described in detail below.

In a first working scenario, when the on board unit is powered on and the external device is not connected to the in-vehicle center console, the voltage of the power supply control terminal S1 of the hub gradually rises; and when the rising time for the voltage of the power supply control terminal S1 of the hub to rise to the first voltage is long (for example, the rising time is greater than the first preset time), the overcurrent protection may be triggered.

Figure 5:
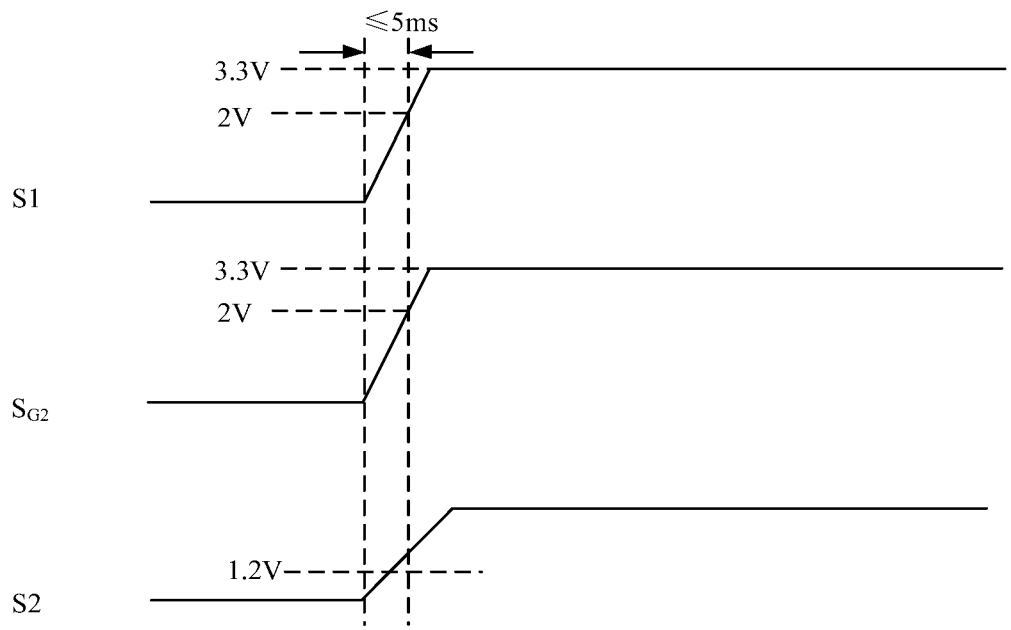
FIG. 5 is a timing diagram of a timing control circuit, in accordance with embodiments of the present disclosure.

For example, as shown in FIG. 5, the first voltage is 2 V, the first preset time is 5 ms, the normal operating voltage of the hub is 3.3 V, and the second voltage is 1.2 V; when the on board unit is powered on, the rising time for the voltage of the power supply control terminal S1 of the hub to rise to 2 V is less than or equal to 5 ms, and the rising time for the voltage of the second terminal $S_{G2}$ of the overcurrent determining device to rise to 2 V is less than or equal to 5 ms; therefore, the overcurrent protection is not triggered. The voltage of the input terminal S2 of the voltage conversion circuit rises to 1.2 V within 5 ms.

In the first working scenario, the voltage of the power supply control terminal S1 of the hub and a charging current $I_c$ of the capacitor $C_0$ may be expressed by the following formulas:

$$V_{S1} = V_{dd} - r_2 \times I_C; \qquad (1)$$

$$I_C = \frac{V_{dd}}{(r_1 + r_2)} \times e^{-\frac{T}{(r_1+r_2) \times c}}; \qquad (2)$$

where $V_{S1}$ is the voltage of the power supply control terminal S1, $V_{dd}$ is the voltage of the voltage terminal $V_{DD}$ of the hub, $I_c$ is the charging current of the capacitor $C_0$, C is the capacitance of the capacitor $C_0$, $r_1$ is the resistance of the first resistor $R_1$, $r_2$ is the resistance of the second resistor $R_2$, and T is the rising time for the voltage of the power supply control terminal S1 to rise to the first voltage.

In combination with the above formulas (1) and (2), the obtained rising time T for the voltage of the power supply control terminal S1 of the hub to rise to the first voltage may be expressed by the following formula:

$$T = -\ln \frac{V_{dd} - V_{S1}}{r_2 \times \frac{V_{dd}}{(r_1 + r_2)}} \times (r_1 + r_2) \times C. \qquad (3)$$

In order to ensure that the timing control circuit does not trigger the overcurrent protection, the rising time T may be less than or equal to the first preset time. That is, the rising time T may meet the following formula:

$$T \leq T_1 \qquad (4);$$

where $T_1$ is the first preset time.

In combination with the formulas (3) and (4), in order to ensure that the rising time T for the voltage of the power supply control terminal S1 of the hub to rise to the first voltage is short, the resistance $r_1$ of the first resistor R1 may meet the following formula:

$$(r_1 + r_2) \times C \leq -\frac{T_1}{\ln \frac{V_{dd} - V_{S1}}{V_{dd}} - \ln r_2 + \ln(r_1 + r_2)}. \qquad (5)$$

In the formula (5), since $(r_1+r_2) \times C > 0$ and $T > 0$, it may be obtained that:

$$\ln \frac{V_{dd} - V_{S1}}{V_{dd}} - \ln r_2 + \ln(r_1 + r_2) < 0. \qquad (6)$$

For example, considering an example in which $V_{dd}$ is 3.4 V, the first voltage is 2 V, and $r_2$ is 62.5 kΩ, since the rising time T is the time for the voltage of the power supply control terminal S1 of the hub to rise to the first voltage, the voltage $V_{S1}$ of the power supply control terminal S1 in the formula (6) is the first voltage; by substituting $V_{dd}$=3.4 V, $V_{S1}$=2 V, and $r_2$=62.5 kΩ into the formula (6), it is obtained that:

$$r_1 \leq 89K\Omega \qquad (7).$$

In addition, in order to avoid a problem that due to an overlarge capacitance of the capacitor $C_0$, the rising time for the voltage of the power supply control terminal S1 to rise to the first voltage is greater than the first preset time and the overcurrent protection triggered, in the present disclosure, the discharge time, from the start of the discharge of the capacitor $C_0$ to the time when the voltage of the input terminal S2 of the voltage conversion circuit is the second voltage, is restrained (for example, the discharge time is less than or equal to the second preset time). Therefore, it is ensured that the capacitance of the capacitor is not too large.

For example, considering an example in which the first preset time is 5 ms, the first voltage is 2 V, the second voltage is 1.2 V, and the second preset time is 21.5 ms, when the capacitor $C_0$ meets that the discharge time, from the start of the discharge of the capacitor $C_0$ to the time when the voltage of the input terminal S2 of the voltage conversion circuit is 1.2 V, is less than or equal to 21.5 ms, the power supply control terminal S1 does not trigger the overcurrent protection that is caused by the time for the voltage of the power supply control terminal S1 to rise to 2 V to be greater than 5 ms due to the overlarge capacitance of the capacitor $C_0$. In this case, the discharge time from the start of the discharge of the capacitor $C_0$ to the time when the voltage of the input terminal S2 of the voltage conversion circuit is the second voltage may meet the following formula:

$$T' = -\ln\frac{V_2}{V_{S2}} \times r_1 \times C; \quad (8)$$

$$T' \leq T_2; \quad (9)$$

where $T_2$ is the second preset time, $V_2$ is the second voltage, and $V_{S2}$ is an operating voltage of the input terminal S2 of the voltage conversion circuit. The operating voltage $V_{S2}$ of the input terminal S2 of the voltage conversion circuit may be greater than or equal to the second voltage. The embodiments of the present disclosure do not limit the specific values of the operating voltage $V_{S2}$ of the input terminal S2 of the voltage conversion circuit and the second voltage $V_2$. The following embodiments will be described by taking an example in which the operating voltage $V_{S2}$ of the input terminal S2 of the voltage conversion circuit is 3.2 V and $V_2$ is 1.2 V.

For example, considering an example in which $T_2$ is 21.5 ms, $V_2$ as 1.2 V, and $V_{S2}$ is 3.2 V, in order to ensure that the power supply control terminal S1 does not trigger the overcurrent protection that is caused by the time for the voltage of the power supply control terminal S1 to rise to 2 V to be greater than 5 ms due to the overlarge capacitance of the capacitor $C_0$, the capacitance C of the capacitor $C_0$ meets the following formula:

$$C \leq -\frac{T_2}{\ln\frac{V_2}{V_{S2}} \times r_1}. \quad (10)$$

By substituting $T_2$=21.5 ms, $V_2$=1.2 V, $V_{S2}$=3.2 V, $r_1$=89 kΩ into the formula (10), it may be obtained as follows:

$$C \leq 0.25 \mu F \quad (11).$$

In addition, in the first working scenario, in combination with the formula (2), the voltage of the input terminal S2 of the voltage conversion circuit may be expressed by the following formula:

$$V_{S2} = V_{dd} \times e^{-\frac{T_S}{r_1 \times C}}; \quad (12)$$

where $T_S$ is a time at which the power supply control terminal S1 outputs the transient low voltage pulse when the external device is successfully connected to the in-vehicle center console.

In combination with the formulas (11) and (12), it may be deduced that the resistance $r_1$ of the first resistor R1 may meet the following formula:

$$-\frac{T_S}{r_1 \times \ln\frac{V_{S2}}{V_{dd}}} \leq 0.25 \ \mu F. \quad (13)$$

By substituting $T_S$=1 ms, $V_{dd}$=3.4 V, $V_{S2}$=3.2 V into the formula (13), it may be obtained that:

$$r_1 \geq 66 K\Omega \quad (14).$$

It can be understood that, in order to ensure that the rising time for the voltage of the power supply control terminal S1 of the hub to rise to the first voltage is less than or equal to the first preset time, the timing control circuit does not trigger the overcurrent protection; therefore, a value range of the resistance of the first resistor and a value range of the capacitance of the capacitor in the timing control circuit may be calculated according to the specific values of $V_{dd}$, $V_{S1}$, $V_{S2}$, $V_2$, $T_S$, $T_2$, and $r_2$. The specific values of $V_{dd}$, $V_{S1}$, $V_{S2}$, $V_2$, $T_S$, $T_2$, and $r_2$ are not limited in the embodiments of the present disclosure. It should be noted that, in practical applications, the specific values of $V_{dd}$, $V_{S1}$, $V_{S2}$, $V_2$, $T_S$, $T_2$, and $r_2$ will affect the value range of the first resistor and the value range of the capacitance of the capacitor. That is, in order to ensure that the timing control circuit does not trigger the overcurrent protection, the resistance of the first resistor in the timing control circuit needs to meet a certain condition, and the value range of the resistance of the first resistor and the value range of the capacitance of the capacitor are related to the specific values of $V_{dd}$, $V_{S1}$, $V_{S2}$, $V_2$, $T_S$, $T_2$, and $r_2$.

In a second working scenario, when the external device is successfully connected to the in-vehicle center console, the in-vehicle center console is switched from the master device to the slave device, and the power supply control terminal S1 of the hub generates the transient low voltage pulse; and in this case, the capacitor $C_0$ in the timing control circuit may discharge to the voltage conversion circuit. If the voltage of the input terminal S2 of the voltage conversion circuit is lower than the second voltage when the capacitor $C_0$ discharges to the voltage conversion circuit, then the external device will be disconnected from the in-vehicle center console. If the voltage of the input terminal of the voltage conversion circuit is higher than the second voltage when the capacitor $C_0$ discharges to the voltage conversion circuit, then the external device and the in-vehicle center console will not be disconnected.

Figure 6:
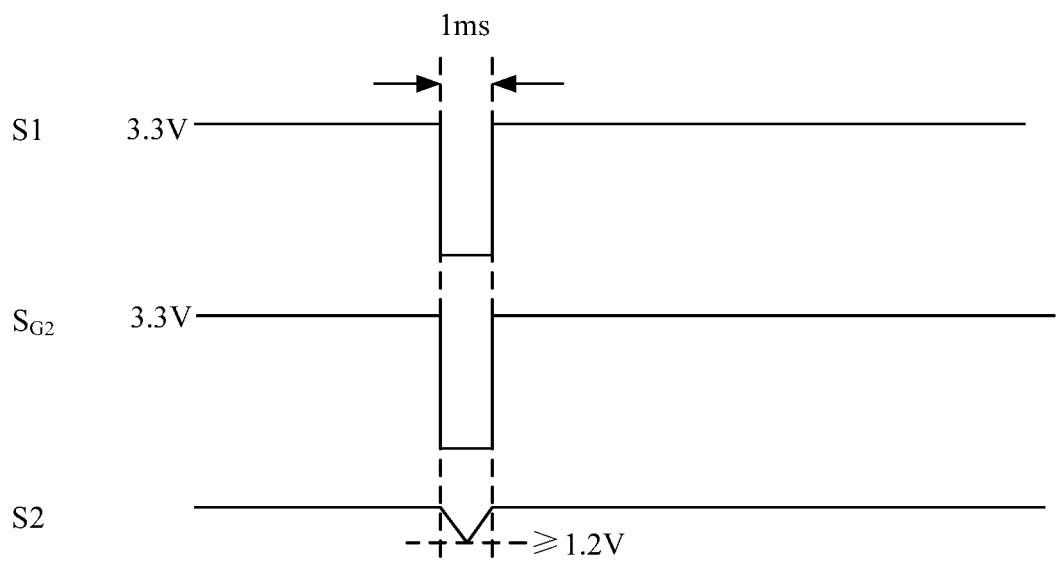
FIG. 6 is a timing diagram of another timing control circuit, in accordance with embodiments of the present disclosure.

For example, as shown in FIG. 6, considering an example in which time in which the power supply control terminal S1 outputs the transient low voltage pulse is 1 ms and the second voltage is 1.2 V, when the external device is successfully connected to the in-vehicle center console, the power supply control terminal S1 and the second terminal $S_{G2}$ of the overcurrent determining device each output the transient low voltage pulse for 1 ms; and in this case, the voltage of the input terminal S2 of the voltage conversion circuit is greater than or equal to 1.2 V; therefore, the voltage conversion circuit can normally supply power to the external device, and the external device and the in-vehicle center console will not be disconnected.

In the second working scenario, in combination with the formulas (2) and (12), in order to ensure that the external device does not disconnect from the in-vehicle center console when the power supply control terminal outputs the transient low voltage pulse, the voltage $V_{S2}$ of the input terminal of the voltage conversion circuit may meet the following formula:

$$V_{S2} \geq V_2 \quad (15);$$

where $V_2$ is the second voltage.

For example, when $V_{dd}$ is 3.4 V, $T_S$ is 1 ms, $r_1$ is 89 kΩ, and $V_2$ is 1.2 V, in order to ensure that the external device does not disconnect from the in-vehicle center console when the power supply control terminal outputs the transient low voltage pulse, in combination with the formulas (12) and (15), the capacitance C of the capacitor $C_0$ meets the following formula:

$$C \geq -\frac{T_S}{r_1 \times \ln\frac{V_2}{V_{dd}}}. \quad (16)$$

By substituting $V_{dd}$=3.4 V, $T_S$=1 ms, $r_1$=89 kΩ, and $V_2$=1.2 V into the formula (10), it may be obtained that:

$$C \geq 0.01 \mu F \quad (17).$$

It can be understood that, in order to ensure that the external device does not disconnect from the in-vehicle center console when the power supply control terminal S1 outputs the transient low voltage pulse, the value range of the capacitance of the capacitor $C_0$ in the timing control circuit may be calculated according to the specific values of $V_{dd}$, $T_S$, $r_1$, and $V_2$. The specific values of $V_{dd}$, $T_S$, $r_1$ and $V_2$ are not limited in the embodiments of the present disclosure. It should be noted that, in practical applications, the specific values of $V_{dd}$, $T_S$, $r_1$, and $V_2$ will affect the value range of the capacitor. That is, in order to ensure that the external device does not disconnect from the in-vehicle center console when the power supply control terminal outputs the transient low voltage pulse, it is required that the voltage of the input terminal of the voltage conversion circuit is greater than or equal to the second voltage. Therefore, the capacitance of the capacitor in the timing control circuit needs to meet a certain condition, and the value range of the capacitance of the capacitor is related to the specific values of $V_{dd}$, $T_S$, and $V_2$.

In a third working scenario, when the external device is successfully connected to the in-vehicle center console, the power supply control terminal S1 detects that the duration of the overcurrent of the external device is greater than or equal to the third preset time, and the timing control circuit triggers the overcurrent protection.

The third preset time may be the same as the first preset time, or may be different from the first preset time. The embodiments of the present disclosure do not limit the third preset time. The following embodiments will be described by taking an example in which the third preset time is equal to the first preset time.

Figure 7:
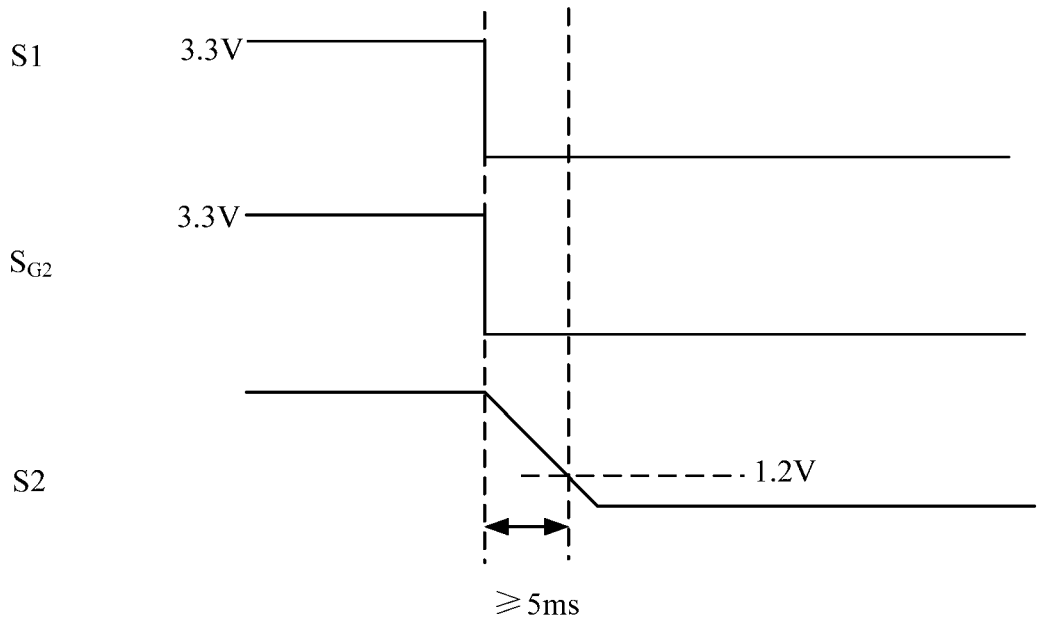
FIG. 7 is a timing diagram of yet another timing control circuit, in accordance with embodiments of the present disclosure.

For example, as shown in FIG. 7, considering an example in which the second voltage is 1.2 V and the third preset time is 5 ms, when the current of the external device is too large, the voltage of the power supply control terminal S1 and the voltage of the second terminal $S_{G2}$ of the overcurrent determining device change to low levels instantly. The capacitor $C_0$ discharges to the voltage conversion circuit; in order to ensure that the voltage conversion circuit can normally supply power to the external device in the first 5 ms of the overcurrent of the external device, there is a need to ensure that the decreasing time for the voltage of the input terminal S2 of the voltage conversion circuit to decrease to 1.2 V is greater than or equal to 5 ms; therefore, it is possible to ensure that the external device is not disconnected from the in-vehicle center console in the first 5 ms of the overcurrent of the external device.

In a third working scenario, the second voltage may be expressed by the following formula:

$$V_2 = V_{S2} \times e^{-\frac{T''}{r_1 \times C}}; \quad (18)$$

where T" is the decreasing time.

In order to ensure that when the external device occurs the overcurrent and the duration of the overcurrent is within the range of the first third preset time, the voltage conversion circuit can normally supply power to the external device, and the decreasing time T" for the voltage of the input terminal S2 of the voltage conversion circuit to decrease to the second voltage may meet the following formula:

$$T'' = -\ln\frac{V_2}{V_{S2}} \times r_1 \times C; \quad (19)$$

$$T'' \geq T_3; \quad (20)$$

where $T_3$ is the third preset time.

For example, $V_{S2}$ is 3.2 V (a voltage at which the voltage conversion circuit works normally), $V_2$ is 1.2 V, $T_3$ is 5 ms, and $r_1$ is 89 kΩ, and in order to ensure that the voltage conversion circuit may normally supply power to the external device in the first 5 ms of the overcurrent of the external device, the capacitance C of the capacitor $C_0$ meets the following formula:

$$C \geq -\frac{T_3}{\ln\frac{V_2}{V_{S2}} \times r_1}. \quad (21)$$

$V_{S2}$=3.2 V, $V_2$=1.2 V, $T_3$=5 ms, and $r_1$=89 kΩ are substituted into the formula (15) to obtain:

$$C \geq 0.057 \mu F \quad (22).$$

It can be understood that, in order to ensure that the voltage conversion circuit may normally supply power to the external device in the first 5 ms of the overcurrent of the external device, the value range of the capacitance of the capacitor in the timing control circuit may be calculated according to the specific values of $V_{S2}$, $V_2$, $T_3$, and $r_1$. The specific values of $V_{S2}$, $V_2$, $T_3$, and $r_1$ are not limited in the embodiments of the present disclosure. It should be noted that, in practical applications, the specific values of $V_{S2}$, $V_2$, $T_3$, and $r_1$ will affect the value range of the capacitance of the capacitor. That is, in order to ensure that the voltage conversion circuit may normally supply power to the external device in the first 5 ms of the overcurrent of the external device, the capacitance of the capacitor in the timing control circuit needs to meet a certain condition, and the value range of the capacitance of the capacitor is related to the specific values of $V_{S2}$, $V_2$, $T_3$, and $r_1$.

In summary, according to the formulas (7), (11), (14), (17), and (22), it may be obtained as follows:

$$0.057 \mu F \leq C \leq 0.25 \mu F \quad (23);$$

$$66 K\Omega \leq r_1 \leq 89 K\Omega \quad (24).$$

That is, when the resistance $r_1$ of the first resistor $R_1$ and the capacitance C of the capacitor $C_0$ meet the formulas (23) and (24), it may be possible to ensure that the external device do not exit or fail to enter the Carplay mode or the Android Auto mode when the external device is connected to the in-vehicle center console, so that the user experience is improved. It may also be possible to ensure that the voltage conversion circuit can normally supply power to the external device during the period from the start of the overcurrent of the external device to the time when the overcurrent protection is triggered.

For example, $V_{dd}$ is 3.4 V, $V_{S1}$ is 2 V, $r_2$ is 62.5 kΩ, $V_{S2}$ is 3.2 V, and $V_2$ is 1.2 V, $r_1$ takes 82 kΩ in the value range of the first resistor $R_1$, and C takes 0.22 uF in the value range of the capacitor $C_0$. By substituting $V_{dd}$=3.4 V, $V_{S1}$=2 V, $r_2$=62.5 kΩ, $r_1$=82 kΩ, and C=0.22 uF into the formula (3), it may be obtained that the rising time T for the voltage of the power supply control terminal S1 of the hub to rise to the first voltage is 1.6 ms (T=1.6 ms). That is, when $r_1$ is 82 kΩ and C is 0.22 uF, the rising time T for the voltage of the power supply control terminal S1 of the hub to rise to the first voltage is less than the first preset time of 5 ms. It can be seen that, when the resistance of the first resistor is greater than or equal to 66 kΩ and less than or equal to 89 kΩ (66 kΩ≤$r_1$≤89 kΩ), and the capacitance C of the capacitor is greater than or equal to 0.057 uF and less than or equal to 0.25 uF (0.057 uF C 0.25 uF), it can be ensured that the rising time for the voltage of the power supply control terminal S1 of the hub to rise to the first voltage is short, so that the timing control circuit does not trigger the overcurrent protection, and in turn the external device may be connected to the in-vehicle center console.

For example, considering an example in which $V_{dd}$ is 3.4 V and $T_S$ is 1 ms, $r_1$ takes 82 kΩ in the value range of the first resistor $R_1$, and C takes 0.22 uF in the value range of the capacitor $C_0$. By substituting $V_{dd}$=3.4 V, $T_S$=1 ms, $r_1$=82 kΩ, and C=0.22 uF into the formula (12), it may be obtained that the voltage $V_{S2}$ of the input terminal S2 of the voltage conversion circuit is equal to 3.2 V ($V_{S2}$=3.2 V). That is, when the power supply control terminal S1 outputs the transient low voltage pulse for 1 ms, the voltage $V_{S2}$ of the input terminal S2 of the voltage conversion circuit is greater than the second voltage 1.2 V. It can be seen that, when the resistance of the first resistor meets 66 kΩ≤$r_1$≤89 kΩ, and the capacitance C of the capacitor meets 0.057 uF≤C≤0.25 uF, it can be ensured that when the hub generates the transient low voltage pulse, the voltage conversion circuit can normally supply power to the external device, and in turn ensured that the external device and the in-vehicle center console can be normally connected.

For example, considering an example in which $V_2$ is 1.2 V and $V_{S2}$ is 3.2 V, $r_1$ takes 82 kΩ in the value range of the first resistor $R_1$, and C takes 0.22 uF in the value range of the capacitor $C_0$. By substituting $V_2$=1.2 V, $V_{S2}$=3.2 V, $r_1$=82 kΩ, and C=0.22 uF into the formula (19), it may be obtained that the decreasing time T" for the voltage of the input terminal S2 of the voltage conversion circuit to decrease to the second voltage is 17 ms (T"=17 ms). That is, when the current of the external device is too large, the decreasing time T" of the voltage of the input terminal S2 of the voltage conversion circuit to decrease to the second voltage is greater than the third preset time of 5 ms. It can be seen that, when the resistance of the first resistor meets 66 kΩ≤$r_1$≤89 kΩ, and the capacitance C of the capacitor meets 0.057 uF≤C≤0.25 uF, it can be ensured that the voltage conversion circuit can normally supply power to the external device in the first 5 ms of the overcurrent of the external device.

Figure 8:
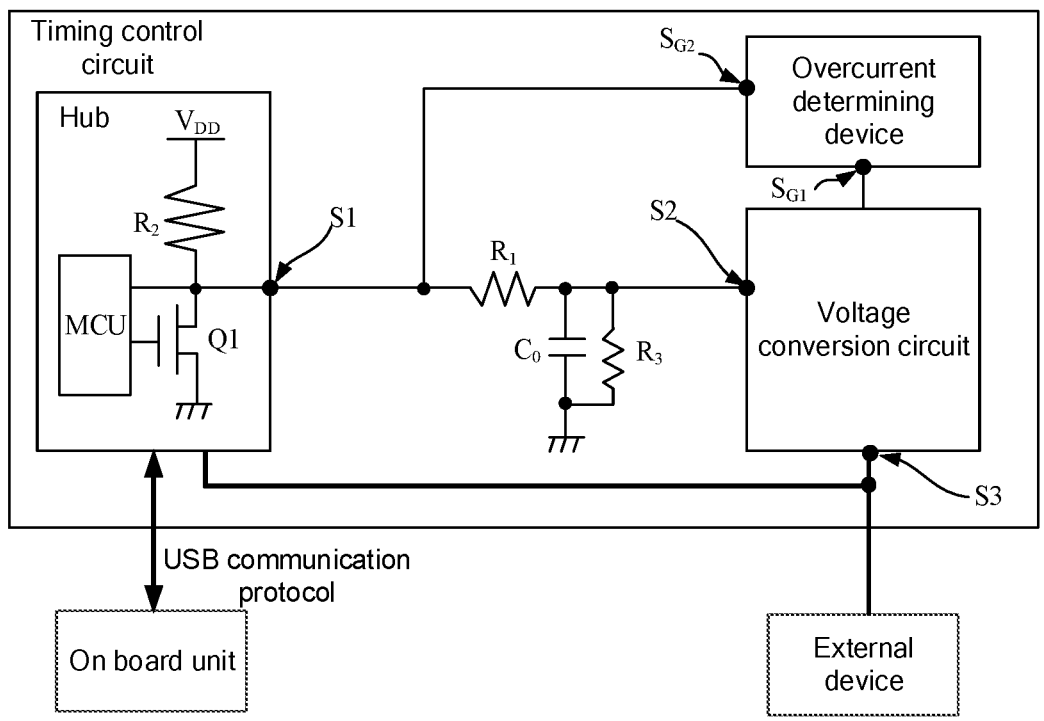
FIG. 8 is a schematic diagram showing a circuit structure of yet another timing control circuit, in accordance with embodiments of the present disclosure.

FIG. 8 is a diagram showing a circuit structure of another timing control circuit provided in the embodiments of the present disclosure. In some embodiments, as shown in FIG. 8, the timing control circuit further includes a third resistor $R_3$ connected in parallel with the capacitor $C_0$. A first terminal of the third resistor $R_3$ is coupled to an input terminal S2 of the voltage conversion circuit, and a second terminal of the third resistor $R_3$ is grounded.

As shown in FIG. 8, when the on board unit is powered on, since the third resistor $R_3$ (which may also be referred to as a pull-down resistor) is coupled to the input terminal S2 of the voltage conversion circuit, when the power supply control terminal S1 of the hub does not output a high level, the input terminal S2 of the voltage conversion circuit may be fixed at a low level due to the third resistor $R_3$. Therefore, it may avoid misoperation caused by the interference on the voltage conversion circuit when the on board unit is powered on.

Figure 9:
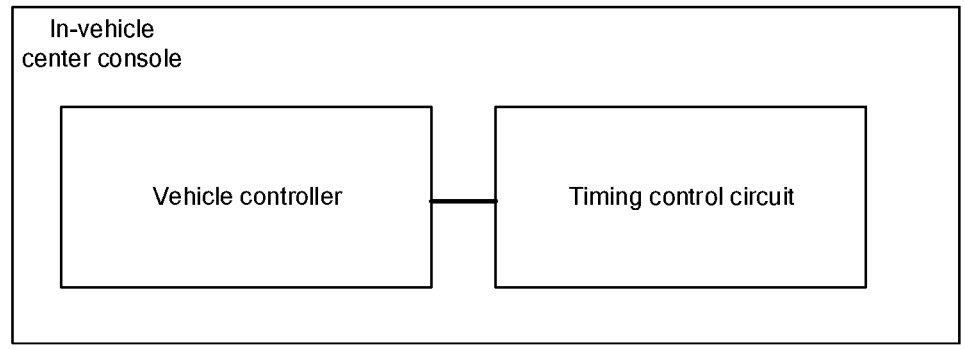
FIG. 9 is a schematic structural diagram of an in-vehicle center console, in accordance with embodiments of the present disclosure.

FIG. 9 is a schematic structural diagram of an in-vehicle center console provided in the embodiments of the present disclosure. The embodiments of the present disclosure further provide an in-vehicle center console. As shown in FIG. 9, the in-vehicle center console includes a vehicle controller, and any one of the timing control circuits shown in FIGS. 2 to 4 and 8. The beneficial effects of the in-vehicle center console are the same as those of the timing control circuit, and details are not repeated here.

Figure 10:
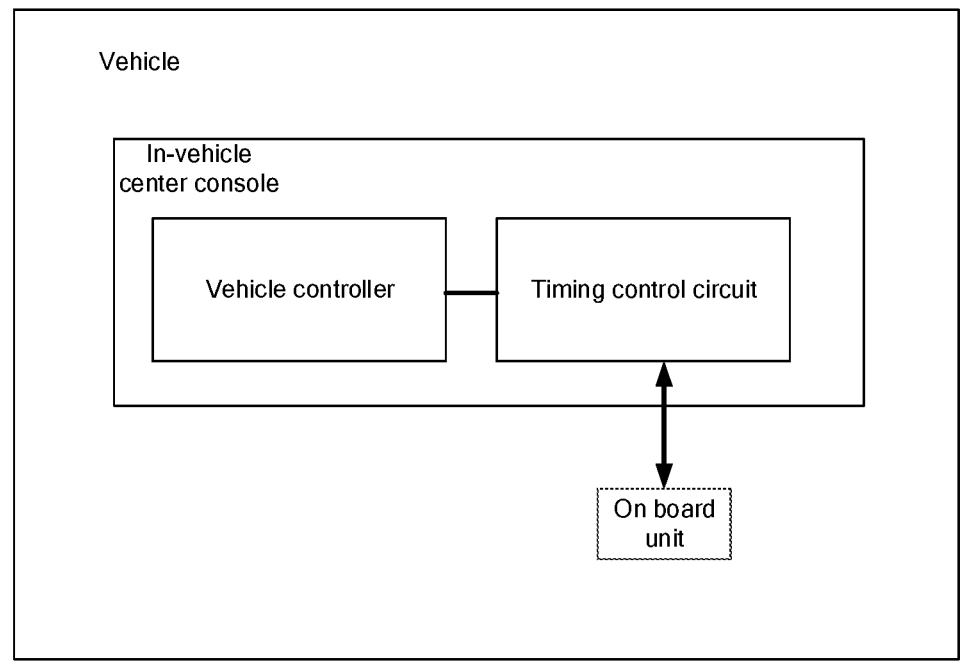
FIG. 10 is a schematic structural diagram of a vehicle, in accordance with embodiments of the present disclosure.

FIG. 10 is a schematic structural diagram of a vehicle provided in the embodiments of the present disclosure. The embodiments of the present disclosure further provide a vehicle. As shown in FIG. 10, the vehicle includes an on board unit, a vehicle controller, and any one of the timing control circuits shown in FIGS. 2 to 4 and 8.

Finally, it should be noted that the foregoing embodiments are merely used to describe the technical solutions of the present disclosure, but the technical solutions of the present disclosure are not limited thereto; although the present disclosure has been described in detail with reference to the foregoing embodiments, a person skilled in the art should understand that the technical solutions described in the foregoing embodiments can be changed, or some of the technical features may be equivalently replaced; and these changes or replacements shall not make the essence of the corresponding technical solutions depart from the spirit and scope of the technical solutions of the embodiments of the present disclosure.

What is claimed is:

1. A timing control circuit, applied to an in-vehicle center console and comprising:
   a hub, a first resistor, a capacitor and a voltage conversion circuit, wherein:
   the hub is used to be coupled to an on board unit;
   a power supply control terminal of the hub is coupled to a first terminal of the first resistor;
   a second terminal of the first resistor is coupled to a first terminal of the capacitor and an input terminal of the voltage conversion circuit;
   a second terminal of the capacitor is grounded; and
   an output terminal of the voltage conversion circuit is used to be connected to an external device.

2. The timing control circuit according to claim 1, wherein the hub includes a second resistor, a first terminal of the second resistor is coupled to a voltage terminal, and a second terminal of the second resistor is the power supply control terminal of the hub.

3. The timing control circuit according to claim 2, wherein a resistance of the first resistor meets a following formula:

$$\ln\frac{V_{dd} - V_{s1}}{V_{dd}} - \ln r_2 + \ln(r_1 + r_2) < 0;$$

wherein $V_{dd}$ is a voltage of the voltage terminal, $V_{S1}$ is a voltage of the power supply control terminal, $r_1$ is a resistance of the first resistor, and $r_2$ is a resistance of the second resistor.

4. The timing control circuit of claim 3, wherein a capacitance of the capacitor meets a following formula:

$$C \leq -\frac{T_2}{\ln\frac{V_2}{V_{S2}} \times r_1};$$

wherein C is the capacitance of the capacitor, $V_2$ is a second voltage, $V_{S2}$ is an operating voltage of the input terminal of the voltage conversion circuit, and $T_2$ is a second preset time.

5. The timing control circuit according to claim 4, wherein the resistance of the first resistor further meets a following formula:

$$-\frac{T_S}{r_1 \times \ln\frac{V_{S2}}{V_{dd}}} \leq C;$$

where $T_S$ is a time when the power supply control terminal of the hub outputs a transient low voltage pulse.

6. The timing control circuit according to claim 5, wherein the capacitance of the capacitor further meets a following formula:

$$C \geq -\frac{T_S}{r_1 \times \ln\frac{V_2}{V_{dd}}}.$$

7. The timing control circuit according to claim 6, wherein the hub further includes a switching element; a first terminal of the switching element is coupled to the second terminal of the second resistor, a second terminal of the switching element is grounded, and a third terminal of the switching element is a control terminal;

in a case where the timing control circuit triggers an overcurrent protection, the switching element is in an on state; and in a case where the timing control circuit does not trigger the overcurrent protection, the switching element is in an off state.

8. The timing control circuit according to claim 7, wherein the capacitance of the capacitor further meets a following formula:

$$C \geq -\frac{T_3}{\ln\frac{V_2}{V_{S2}} \times r_1};$$

wherein $T_3$ is a third preset time.

9. The timing control circuit according to claim 8, wherein the resistance $r_1$ of the first resistor is greater than or equal to 66 kΩ and less than or equal to 89 kΩ, and the capacitance C of the capacitor is greater than or equal to 0.057 μF and less than or equal to 0.25 μF.

10. The timing control circuit according to claim 1, further comprising a third resistor, wherein a first terminal of the third resistor is coupled to the input terminal of the voltage conversion circuit, and a second terminal of the third resistor is grounded.

11. An in-vehicle center console, comprising a vehicle controller, and the timing control circuit according to claim 1.

12. A vehicle, comprising the on board unit, and the vehicle center console according to claim 11.

* * * * *